Sept. 1, 1970
S. R. GILFORD ET AL
3,526,125
TEST SAMPLE IDENTIFYING SYSTEM AND APPARATUS FOR
USE IN CONNECTION THEREWITH
Filed Dec. 19, 1967
5 Sheets-Sheet 1
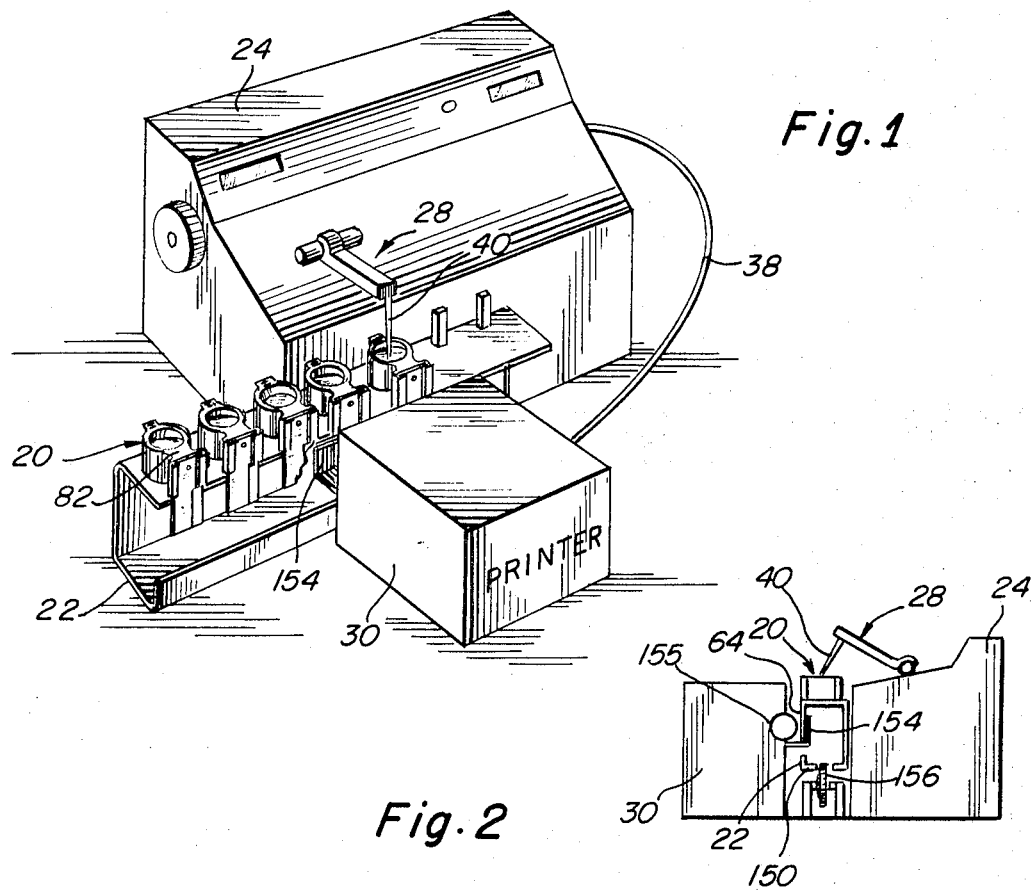
Fig. 1
Fig. 2
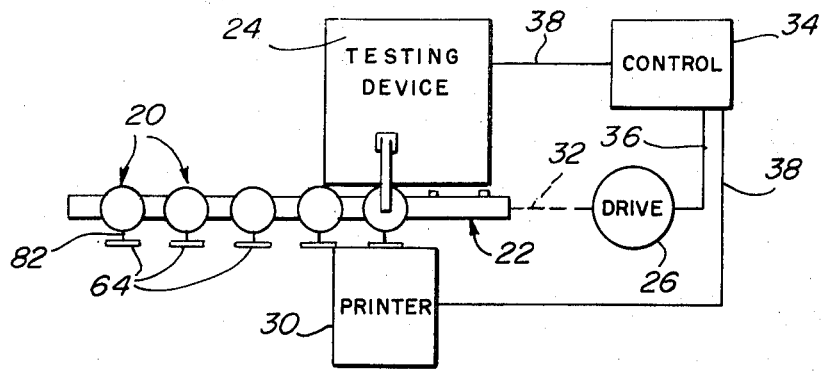
Fig. 3
INVENTORS
SAUL R. GILFORD
ROBERT J. EMARY
BY Silverman + Cass
ATTORNEYS

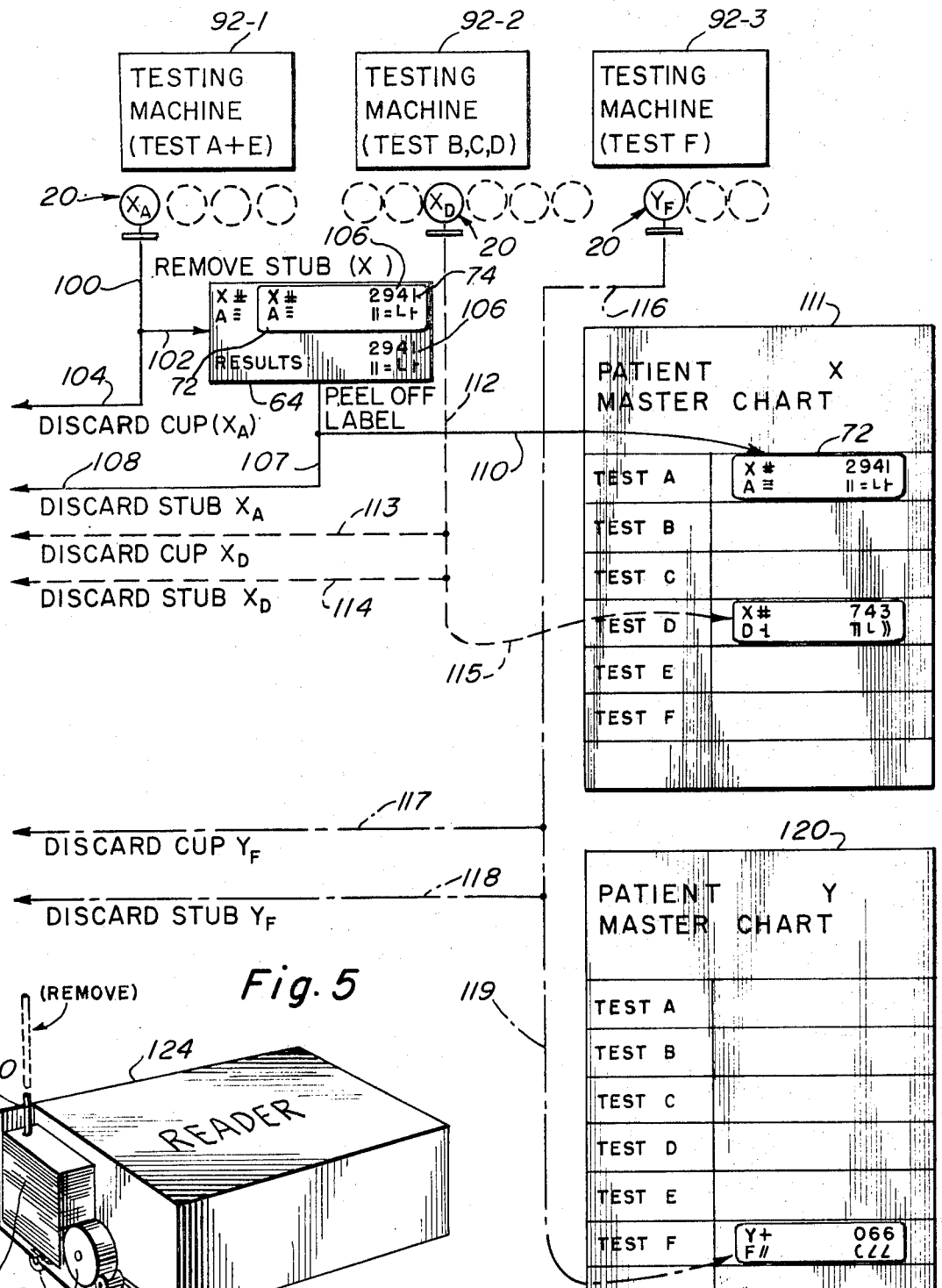

Sept. 1, 1970　　　　S. R. GILFORD ET AL　　　3,526,125
TEST SAMPLE IDENTIFYING SYSTEM AND APPARATUS FOR
USE IN CONNECTION THEREWITH
Filed Dec. 19, 1967　　　　　　　　　　　　5 Sheets-Sheet 5

INVENTORS
SAUL R. GILFORD
ROBERT J. EMARY

BY Silverman + Cass
ATTORNEYS

United States Patent Office 3,526,125
Patented Sept. 1, 1970

3,526,125
TEST SAMPLE IDENTIFYING SYSTEM AND APPARATUS FOR USE IN CONNECTION THEREWITH
Saul R. Gilford and Robert J. Emary, Oberlin, Ohio, assignors to Gilford Instrument Laboratories Inc., Oberlin, Ohio, a corporation of Ohio
Filed Dec. 19, 1967, Ser. No. 691,751
Int. Cl. A61b 5/00
U.S. Cl. 73—53
27 Claims

ABSTRACT OF THE DISCLOSURE

A testing system wherein positive identification as to source, test performed and results for each of a plurality of containers carrying test samples is maintained, the system providing each container with cards carrying identifying indicia, means for presenting said containers to sample testing means to perform an identified test and simultaneously providing synchronized data printing means to apply the test results to the card without moving the container from its testing position and wherein the completion of the test and the printing of the results occur substantially simultaneously. The containers are provided with means for indexing the position of same for performance of the test and receipt of the printed results. The invention further contemplates the use of identifying cards to which are applied peelable readherable labels and transport means to direct the containers to the proper sample testing means. Identification as to source, the test to be performed and results thereof are carried by said identifying card.

---

The raw fluids are taken from the source which is identified on several cards by suitable indicia, each card having all of the source information, and in addition the test identification or description together with an area on which the test results will be entered. The fluids are processed as by dilution, mixing with reagents and the like and finally become test samples in suitable containers. The system contemplates that each container will carry one card with the complete identification of source and test, in human or machine sensible data or indicia, and likewise, that the card may also have a peelable self-adhering label with substantially the same indicia. All sample containers for any given kind of test are handled together in a single testing device, being carried into testing position while riding a suitable rack or conveyor structure, and, when in the testing condition, being disposed so that the peelable label is in printing position relative to a printing machine. The testing is performed and, substantially simultaneously, data representing the test results will be printed into the appropriate area provided therefor, this being on the peelable label if the card is provided therewith.

All of the tests of one given kind having been completed, the containers are discarded and their cards are retained. Each peelable self-adhering label is removed and applied to a master card which is identified also with the source, this card having a suitable blank for reception of each label representing a single test. There will be as many sample cards as containers, and these will represent samples derived from a plurality of sources, but, nonetheless all completely identified. Other testing machines will be providing cards carrying data required to be transferred to the different master cards. In this way, the tests are handled without fear of confusion since each container has its own card with suitable identification making errors unlikely, and certainly, readily detectable if they occur.

Establishments provided with suitable equipment need not redistribute the cards after testing, but may have the technician remove the card from the sample container and simply introduce the same to a reader which responds to the identification data and test results, storing the information if need be, or sending it by suitable channels to the source storage or data entry card. In such cases, the card will be required to have machine sensible data and the test results and test description will also be required to be machine sensible. Peelable labels are not needed where automatic card readers are used, but will preferably be used to provide versatility. If a reader is available, the label is permitted to remain in place.

The apparatus with which the invention is concerned and used in the above described system comprises sample containers, container handling structures, testing and printing machines, and the like. The container is characterized by provision of a disposable receptable having a socket for securement thereof to a rack or conveyor, a bracket for mounting the identification card and means for indexing the card properly so that it will align with the printing mechanism. The rack or conveyor or other carrying apparatus will have a plurality of the containers mounted thereon, all containers carrying test samples to be subjected to a single test, and these being arranged so that the card secured respectively thereto will be disposed, usually depending, in proper position relative to a printing device. Some form of back-up plate will be carried by the rack or provided on the printing device so that the card will have an unyielding base against which printing means, such as number wheels may press the card. The invention contemplates any form of indicia producing device which can enter the test results on the card carried by the container, including magnetic state changing apparatus, punching devices, bar printers and the like. In a simple form the printer will print both numbers and bar code to enable the results to be read by humans or subsequently energized readout machines.

BACKGROUND OF THE INVENTION

The field of this invention is the testing of liquids and the identification of the source of the liquid, identification of the test which is made on the sample, and the relation of the test results data with the source. As will be appreciated by those skilled in this art, there are many areas in which the invention is applicable, these including industry and medicine. Many aspects of industry require continuous sampling and testing of liquids. Several examples that come to mind are quality control, analysis and assay, measurement of particular components, turbidity, and contamination measurement, and the like. In medicine and biology continuous testing of liquid samples goes on. In every case, regardless of whether industry or medicine, an important problem is positive identification.

Since the invention herein was developed primarily for use in handling biological fluids, the description will be particularly directed to this application thereof, but it is to be kept in mind that this is only by way of example, and is not to be considered to limit the invention.

In many laboratories connected especially with hospitals and clinics, fluids are routinely tested as an aid to the diagnosis and treatment of disease. In research to a lesser degree, similar testing is carried out in a routine manner. The invention is concerned with identifying samples throughout the entire period of time between their being taken from the patient or animal, called the source herein, and the deriving of data obtained as a result of tests on the samples. Any source is intended, since obviously in the case of industrial work, the source may be a batch of chemical, a bath, a stream of liquid, etc.

The identification in every case must relate each sample and its test to the proper source for any benefit to be obtained from the testing. The principal problem which arises is ensuring that this identification will be positive through the testing of a large number of samples. If these derive from multiple sources and are required to be subject to multiple tests, the problem is compounded. It readily can be seen that, given a positive and dependable system of identification, a large number of samples derived from different sources, as, for example, patients in different parts of a given hospital, can be tested in a given testing device with speed and efficiency. So long as the testing personnel have the assurance that samples will always remain fully identified, they can concentrate on the testing techniques. Also, such guaranty opens a new avenue for high-speed automated testing with apparatus that need not be scrutinized or synchronized for the purpose of maintaining sample identification.

A number of so-called automatic sample testing machines have been devised, and these are disclosed in the literature including commercial periodicals and the patented art. For the most part they are complex and expensive. The small laboratory or low-budget institution normally will not avail itself of these devices due to expense and for other reasons. Probably the most important of these reasons is that sample identification is difficult and usually expensive. Moreover, complexity and expense are no guaranty that samples being handled properly will be segregated and identified. As a practical fact, there appears to be no method of positively ensuring the source identifications of test samples handled in quantity, even in some of the more sophisticated machines commercially available today.

In the case of the fully automated apparatus, in large institutions where the use of such complex and expensive machine may be justified, one might guess that a computer would be available for results identification, but this has not been found to follow. Accordingly, even with these fully automated devices, errors can arise. Sorting, classifying, synchronizing, etc. are all sources of error. For example, a sample entering a flow-through machine will be tested and have its results produced several minutes later. The timing of the samples and relation to results provide sources of error. As a matter of practice, even if a computer were present, unless there was another expensive and complex piece of equipment to convert results into programming data for the computer, a technician would have to do it, thereby giving rise to another possible source of error.

The invention herein, while useful with large systems, is very effective for use in highly simplified systems where positive sample identification is achieved, and one of the most effective ways of demonstrating the advantages of the structure and system of the invention is to discuss the types of solutions to this problem which are known or obvious. The shortcomings of these solutions are eliminated by the invention.

One obvious system of sample identification calls for the technique of placing the samples in an ordered array, such as, for example, in a container rack in which each sample is identified by its order in the rack, this order being identified on a separate chart. Pairing of the sample and its measurement depends completely upon a one-to-one correspondence of the set of results and the set of samples. Any disruption of the array at any point in the operation as a result of a malfunction, for example, will pair answers with improper samples. There is no positive identification of the sample, but more important, there is no unequivocal relation of sample to its result and only its result. This latter is achieved by the invention.

Another alternative that eliminates the disadvantages of the system described above involves the use of coded carriers. Such a system might be made with 12 to 16 bit storage capacity capable of about 10,000 identifying numbers. As the sample is placed in the carrier, a notation identifying the sample must be placed on a master list with subsequent pairing of result and sample. Since the output of the testing machine such as a spectrophotometer is thus an identifying number and a result, it becomes necessary to sort the information out of the printed answers and to transcribe the results on to the master sample list. Since the coded carriers cannot be kept in an ordered array without great difficulty, the clerical job of sorting and transcribing to a large degree nullifies the advantages of the sampling automation, and provides possibilities of error.

The simple combination automatic-manual system which is probably being practiced in many laboratories at the present time must be considered in measuring the advantages of the invention herein, for, if the benefits of the invention are minimal, there would be no justification for added expenditure. This system uses an automatic apparatus described directly below, and which, incidentally, is of the type well suited for use with the invention.

Many such machines are commercially available at this time which are automatic, insofar as a single test result is concerned, the only activity required of the operator being the feeding of a sample to the machine. Assuming that the output of such testing machine can be converted readily into digital data, or is actually so converted in the particular machine, economical and compact printing devices are available for printing the resulting data. As an example, a spectrophotometer is manufactured and sold by the assignee of this application, such spectrophotometer having an output characteristic which is linear with absorbance. Such apparatus is used in medicine, biology and chemistry for making tests which involve measuring absorbance of monochromatic light by samples. A typical example is hemoglobin determination of a blood sample. The output of this commercial apparatus is readily charted or indicated on a counter, and can be printed without difficulty on a suitable paper blank.

The ordinary laboratory may be expected to have one or more of the automatic machines above-described, and may utilize a technique that comprises the simple automatic-manual system mentioned. While ordinary readout and manual entry of data will probably be the most common way that the machine is used, printing of the output will be assumed to emphasize the fact that the sample identification problem still exists with this added refinement.

The simple automatic-manual system will be carried out generally in the following manner. Assume that the operator has a number of containers carrying samples in a rack, each identified by a number or letter on the container. The machine output could be fed directly into a printer which produces a paper sheet carrying the results of the sample testing. Just before feeding a sample to the machine, the operator would read the identifying information and enter it in the printer. The sample testing machine makes its test and produces its output and prints its results in predetermined relation to the entry made manually by the operator. When the series of tests is complete, the printed tape from the printer carries the identification number of sample and the test result for that sample in some relation. Assuming that the operator has identified the sample properly, there is still the necessity of pairing the data from the tape and the master list. There is still the clerical problem of transcribing data from one list and putting them on another. There is still the problem having an operator in attendance required to exercise judgment and make entries, the validity of the results being dependent upon the accuracy of such entries.

With respect to prior art, sample identifying means and systems are disclosed generally in Pats. 3,266,298 and 3,026,764. Automated systems are disclosed in many patents. Both the systems and known sample identifying structures have problems which are believed solved by the invention herein. The invention provides a basis for automation through the use of one or more machines whose output is capable of being converted into digital data.

The invention contemplates that a large number of sources may be used in producing a large number of samples to be tested. For example, several hundred patients in a large hospital may require some form of routine blood tests in a given period of time, such as a day or several days. These tests may be as many as eight or nine and as little as one, but it is vital to the proper operation of the hospital that all tests be performed maintaining complete and accurate patient identification throughout.

This problem will become magnified in perspective when it is understood that raw fluids are taken from the patients and carried to the laboratory where they must be diluted, mixed with reagents and transferred to sample containers or vessels. Thereafter the individual tests must be made, keeping patient and test identification accurate. Add to this the need for proper hospital and laboratory records related to each patient, the need for entering charges for the tests, and other details, and the task becomes complex, with error more and more likely to creep in as the number of samples handled increases.

An important object of the invention is to provide a system and apparatus capable of enabling the testing of a large number of samples derived from a large number of sources in a plurality of tests, while retaining positive source identification with relation to sample and test at all times. As a result of the invention, high speed and efficient handling of samples results, along with many other incidental benefits including simplified record keeping and administration.

Many other objects will become apparent from the discussion and description which follow.

The invention is directed to a system, apparatus for carrying out the system, and a method capable of being carried out by other apparatus in addition to that described.

In the system, the raw fluids derived from the source are processed and introduced into a plurality of containers, each being of the proper dilution and/or carrying the necessary reagent for a different test to be performed. Each container has a card which is carried with the container for the remainder of the time that the container is used, and each card has source identification, test description information and a blank area within which test results will be entered. The cards are prepared when the raw fluid is obtained, preferably using some readily repetitive source identification such as a master plate bearing the source description. All of the containers for any given test are assembled, these being test samples from a plurality of different sources, but all requiring the same handling. Likewise, for other tests, containers are assembled to enable the respective test to be repeated over and over but on test samples from different sources.

The system contemplates that the test results will be entered on the card carried by the container whose sample is being tested, as soon after the test has been performed as feasible. Usually the time elapse is almost imperceptible, but the criterion is that the testing and entry of results are positively interlocked so that no other sample container may be moved into testing position until the results have been entered. This will be done with the container at the testing position, or at most the entry of results may occur at a location so close to the test position that it may be considered substantially at the same location. Once the testing has been performed, the container may be discarded along with its contents, retaining the card that now carries in addition to the source information and the test description, the data derived from the test. Such data may be entered by a printer, magnetic recording device (on suitable surface prepared to receive the same), bar or dot marking apparatus or a punch or preferably a combination of human and machine sensible information.

In a simple system, the card may have a peelable self-adhering label that has the complete human sensible information and data, and this peelable label is readily removed by a technician or clerk and adhered in a suitable blank provided on the source master form, this being, for example, a patient's record card. This is required to be done for all sample cards, and these can be manually sorted and prepared for each patient from the total sample cards gathered after the testing. Preparation consists simply of peeling the label from the container-carried card and transferring it to the master card. The container card is then destroyed.

In a more sophisticated system, the cards are gathered from the tests at random, without regard to order or identification, and these are stacked in any suitable reading machine that can sense the data and information on the cards. The reader machine reads, stores, transmits, classifies, etc. It can be any of a type well known for this purpose, using the form of machine sensible data applied. As mentioned, these can be magnetic, mechanical, and so on. Conveniently, the identical cards with peelable self-adhering labels are also used in this case, so that the user purchases one card and has the option of the manner in which it is used. Accordingly, the peelable label will also have all of the information which appears thereon in machine sensible as well as human sensible form.

In the system as described above, the generation of the test cards provides an excellent control on the administration of the laboratory. A duplicate of the card may go directly to the control department, for entry on patient's records and billing. Alternatively, the generation of the test cards may be accomplished by marking a large blank which has the test card in the form of a perforated stub. The blank may have no prior identifying data, and the technician uses a plate or card which has previously been prepared for the particular source and is kept in a central location, for example. This plate is imprinted in retail establishments on receipts or debit memoranda, this being done by the technician in a portable imprinter which may also have buttons or keys to enable the test description to be entered. All of these entries will be applied to the main body of the blank as well as upon the stub, the stub becoming the card carried by the container. Prepared test description plates may be used to mark the blank.

The apparatus of the invention comprises the sample container with means for carrying the sample card in proper disposition relative to the container so that when properly arranged for testing, a blank area will be provided for the test results. The apparatus includes a testing machine which has sample withdrawing means for taking in a quantity of the sample out of the container and performing the required test with an output that is converted into digital information. There is an indicia producing device, such as a printer or embosser, or the like, which is operated in response to the digital information from the testing machine and it is so located relative to the card to apply the data in the results area.

The container is preferably disposed on some form of rack or moving structure, such as a conveyor or turntable, along with a plurality of others which require the same testing, but being from different sources, or from the same source but prepared in different manners such that the testing machine will produce different reactions. The moving structure is required to bring the containers seriatim into testing relationship with the testing machine and the indicia producing device, so that the procedure described may be carried out. Control means provide the necessary timing and programing of the container conveying structure, the testing machine and sample withdrawing means of the machine and the printer.

One form of moving structure for carrying the containers is in the form of a rack or standard mounting a plurality of containers in alignment, each container having a socket respectively fitting a plurality of pins mounted on the rack. The rack drive can operate as a conveyor might, or in cooperation with a driven tooth and notches or slots on the rack. The rack may be arranged so that the card carried by the respective containers depends from the table top to move into a suitable channel provided in the printer, and be provided with some form of back-up means, either as a flange on the rack or a plate member on the printer.

The invention also contemplates a novel form of container, this being of integral or integrated structure and including a bracket which is grooved or channeled to receive a card therein. Means are provided to retain the card and to index the same relative to the bracket, and the container in turn preferably has means to enable indexing relative to the testing machine and printing means. As mentioned, one method is to provide sockets in the containers, respectively, each socket fitting a pin on the rack and the configuration of the pins and racks being of such nature as to permit of only one proper disposition and indexing. The illustrated pins and sockets are of rectangular cross-section.

BRIEF DESCRIPTION OF THE DRAWINGS

FIG. 1 is a perspective view, somewhat diagrammatic, of apparatus of the invention showing a testing machine, comprising a spectrophotometer arranged to perform tests upon test samples being presented to the machine seriatim, the samples being carried by containers arranged on a rack, and the view likewise illustrating a printing device for applying data to cards carried by the containers. A portion of one container and its card are broken away to show some structural details.

FIG. 2 is a schematic side elevational view of the structure of FIG. 1 showing the relationship between the various structures of the apparatus.

FIG. 3 is a block diagram illustrating in simple form the manner of control of the apparatus of the invention.

FIG. 5 is a diagrammatic view illustrating the manner in which the sample cards are processed after testing, illustrating the summarizing of results of different tests from different machines for different sources.

FIG. 6 is a diagrammatic view illustrating an alternate form of one phase of the system shown in FIG. 5.

DESCRIPTION OF THE PREFERRED EMBODIMENTS

Figure 4:
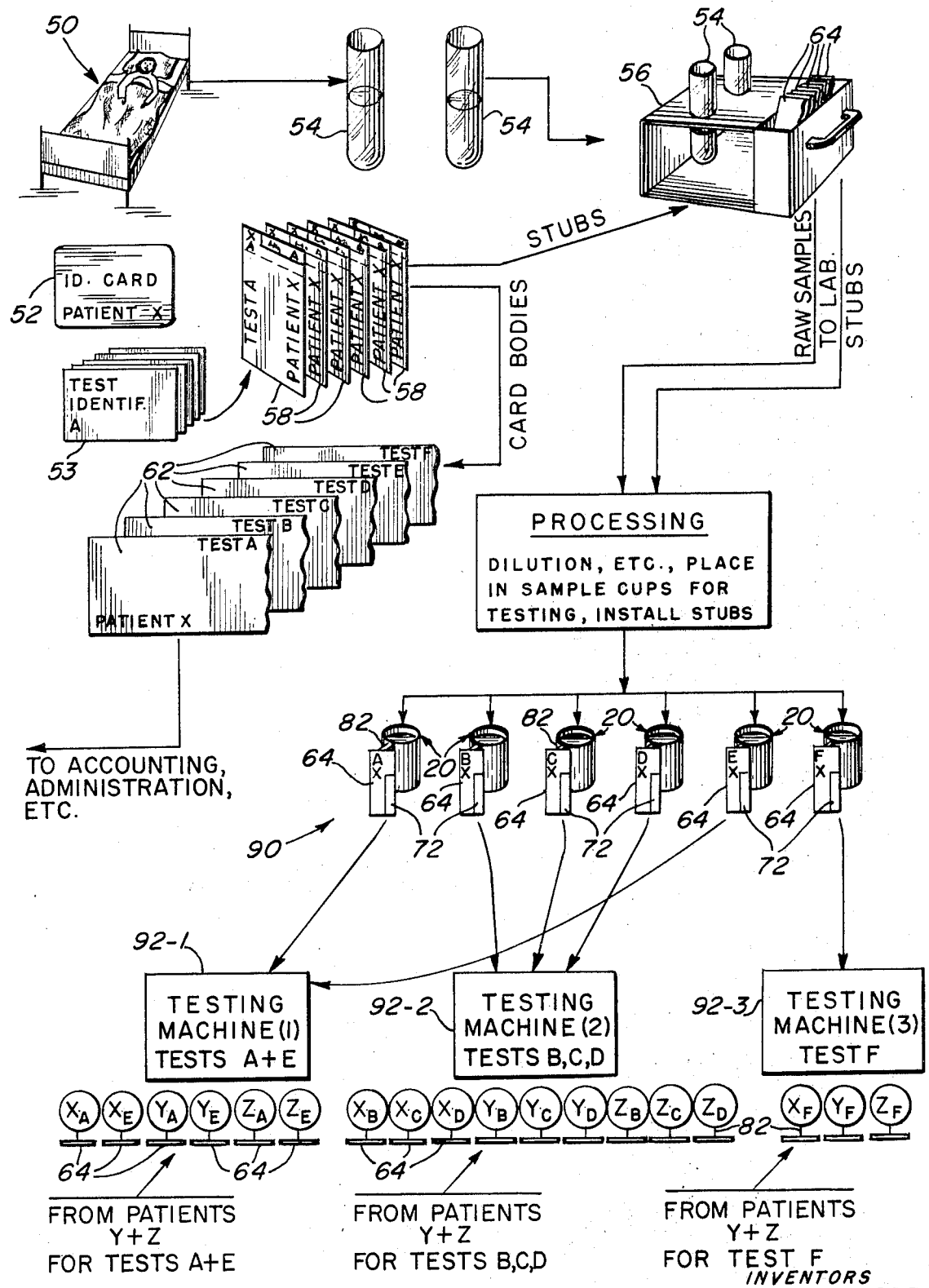
FIG. 4 is a flow diagram showing the major portion of the system of the invention, and used to describe the method thereof, the diagram illustrating the procedure and apparatus from the point of taking the raw fluids from a patient to the point of running a series of tests on a number of samples obtained from different patients.

As indicated in the text above, the value of the invention increases with the number of tests being made, the number of samples being tested, and the number of sources from which the raw fluids for testing have been derived. The reason for this is that the complexity of positive sample identification according to known systems increases with the increase of these numbers, but has no adverse effect on the reliability of the system and structures of the invention. Positive and fool-proof identification obtains in the invention regardless of the number of samples handled, etc.

The most easily described concept of the invention may be said to be one in which container and card are presented to testing and printing apparatus at one time, and the testing and printing occur substantially simultaneously. Since the card carries positive test and source identification in the first place, and test results are added when testing occurs, the container and used sample can be discarded and the card may be used for achieving the final result with positive identification of test and source. In other words, it is impossible to have test results appear on the wrong card providing the card and sample container are handled together up to the instant of testing. This marriage is assured by constructional details built into the card and container, and hence is beyond the vagaries of a concept depending upon exercise of skill, judgment or accuracy by a human. It follows that the only limitation on the speed of handling sample testing is the ability of the testing machine to withdraw samples and test and transmit digital information to the printer, the speed of the printer (which will normally be much greater than the speed of the testing machine), and the speed of the container-carrying structure. Practically, the speed of testing of each sample is usually the controlling factor.

The invention contemplates the use of the sample cards which are fed directly into reading means which properly distribute, summarize, store and so on; and additionally, to sample cards which carry peelable self-adhering labels manually removable for application to summary records.

Referring now to the drawings, reference might first be had generally to various apparatus which are used in the system, merely for familiarization with the overall picture of the invention followed by a discussion of the system. Thereafter details of the various structures and forms of the invention will ensue.

Figure 11:
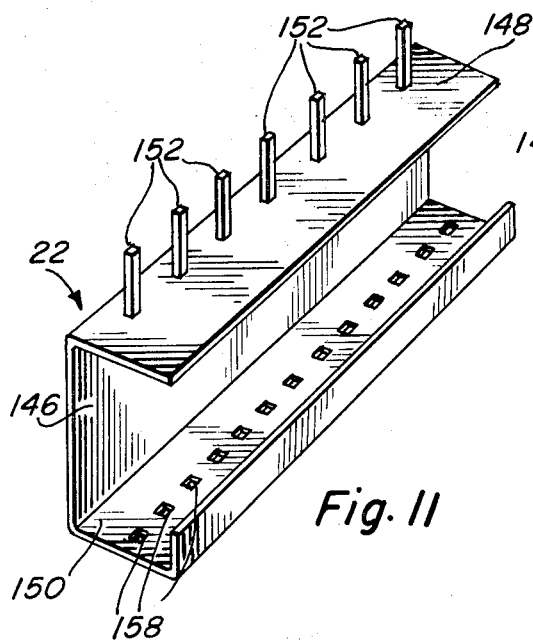
FIG. 11 is a perspective view of a rack for handling a plurality of containers of the construction of FIG. 8, this rack being illustrated on a larger scale than in FIG. 1.

The sample fluids are those which are made in the laboratory from raw fluids derived from the source. These fluids have to be processed in some way, such as diluted, mixed with reagents, centrifuged, etc. It should therefore be appreciated that the containers which have been referred to as the sample containers will be carrying sample fluids already processed by the laboratory and not raw fluids. The sample container of the invention is generally designated by the reference character 20 and constructional details will be described in connection with FIGS. 8 through 12. The sample containers 20 are described below in connection with a rack or sample moving device, which is designated generally 22, and best shown in FIG. 11.

The purpose of the rack 22 is to enable a series of containers carrying samples to move into testing position seriatim. It must be borne in mind that while the rack carries a plurality of containers 20 of identical construction, it will be moving relative to the testing machine to permit this machine to perform a test on each sample. Each sample is different, but not necessarily from different sources. The machine will handle all in the same way. A single source may provide several testing samples produced by diluting with different reagents, but to have absorbances measured by the same wave length, and hence in the same spectrophotometer. For example, the seven containers 20 capable of being carried by the rack 22 could each carry a blood dilution sample from seven different patients, respectively, or different kinds of dilution from less than seven patients. The identical test is performed on each sample, and there will be seven completely unrelated results.

The testing machine in this instance is assumed to be a spectrophotometer capable of measuring absorbance. It is shown at 24 in FIGS. 1 to 3, and the rack 22 is driven past it by some suitable drive means 26 (see FIG. 3), the drive means 26 serving to move the rack and stop it at the proper points in its cycle to coordinate the positioning of the containers relative to the testing machine 24. Generally there is a sample withdrawing means 28 which swings in a vertical plane, and having a snorkle tube 40 that sucks up sample and automatically runs the same through the procedure necessary to obtain the test results. This could be a hemoglobin determination, for example.

It will be seen that the printer 30 is located in relation to the rack 22, its containers 20, and the testing machine such that when results are produced, the printer 30 will be energized to apply indicia to the card which is carried by the container. Likewise, this printer 30 and the testing machine 24 must be coordinated and controlled so that the programming will be achieved that is needed to perform the task at hand. Details of the control are capable of very wide variation, and hence no particular structure is illustrated, but as seen in FIG. 3, the requirements are readily explained and can be worked out by those skilled in this art.

Alluding for the moment to FIG. 3, the rack 22 or other structure for carrying the sample containers 20, is mechanically connected by a linkage designated 32 to some form of drive 26. Translation can be achieved by cam arrangement as, for example, disclosed in U.S. Pat. 3,344,702 for translating cuvettes. Electrical motors, step switches and the like may be used alternatively. As shown in the illustration, the first two positions of the rack 22 have already been passed, so that the third sample container (movement is from left to right) is in testing position. The control means 34 can be any form of programming device, including power source control and the like. It is required to cause the drive means to move the rack 22 to the right and stop the rack when the third container 20 is in the test position shown. This is performed through control channel 36. The control device 34 must next energize the testing device 24 through the control channel 38, or at least start its testing cycle. This could include lowering the sample withdrawing means 28 so that the snorkle tube 40 enters the test sample that is contained in the third sample container. FIG. 2 shows the snorkle tube 40 up, where it must be while the rack 22 is moving, and FIG. 1 shows it down, where it must be to draw in a sample.

The control means 34 is required to keep the printer mechanism 30 poised and eventually cause its operation through the channel 38, but this cannot occur until there are test results. When the testing device has run through its cycle, the snorkle tube 40 is up, having moved to this position after drawing in a sample. Immediately that the test is complete, the test results are converted into digital data by any suitable converter which may be incorporated into the testing machine 24 or be an accessory thereto. This information is communicated to the control device 34, either as a command signal plus digital information for passage to the printer, or may be sent directly to the printer for movement of the printing wheels, for example, but without causing the impression, together with a separate command signal to the control device at the end of the transmission of the test results. In either case, the command signal from the control device will energize the impression means of the printer and cause the numerical and/or code indicia to be applied to the card carried by the container 20. These operations, that is, production of test results and print-out are interlocked in any suitable manner so that it is impossible to produce wrong results on a card. After this has occurred, the control device 34 is required to withdraw the printing impression means, such as swinging wheels (if not already withdrawn automatically), and operate the drive means 26 to move the rack 22 carrying the fourth container 20 to testing and printing position. Thereafter the third container may be removed from the rack whenever the operator desires, the card removed and the container discarded, as will be explained.

With the above general description in mind, the system may be described in detail, and perhaps more readily followed.

In FIG. 4 a flow diagram is shown illustrating the progress made by the samples and cards from the point that the raw fluid is obtained from a source, such as, drawn from the patient, to the point that the testing is accomplished. In the upper left hand corner, the patient 50 is the source of the raw sample fluid, which, for example, is whole blood. In most medium-size hospitals and larger, upon admission of a patient, a master file is opened and some form of master identification card or plate is cut in stiff board or plastic. This identification card is not much different from those used as credit cards today, and it has all of the patient identifying data on it. This would include the name, address, and statistical data with an assigned number; the location of the patient in the hospital, the doctor's name, and perhaps other data. By suitable imprinting machines, this card is used for all transactions involving this patient. Key or lever operated machines of the type also used with familiar credit cards may be used at different locations in the hospital for entering additional information upon the documents produced with the master ID card. It may contain (and usually does) machine sensible structure to enable automatic reading of the data which it imprints or embosses.

The patient ID card is designated 52 in FIG. 4, and the invention conveniently uses a patient master identification plate of this general type in the preferred system. The technician obtains the raw fluid samples in transport tubes, such as illustrated at 54 and will place them in some form of tray 56 to be carried to the laboratory. At the same time the samples are drawn from the patient 50, the patient's ID card is used to make up a plurality of test identifying cards which are illustrated at 58. Each card carries an imprint of the ID card, but in addition will carry test description information. This latter information is easily added by the technician in a portable imprint device readily carried to the patient's room, or could be done in a similar device which is disposed at the principal nurse's station. Most hospitals using this system will have the patient's master ID card 52 at the nurse's station, but the invention could be carried out by means of other types of master members in the patient's room. For example, a bodily worn plate could be used for imprinting on a small portable device. The test information may be added by buttons or keys in the imprinting machine or by using specially prepared imprinting plates carrying all the needed identification, as shown at 53.

Figure 7:
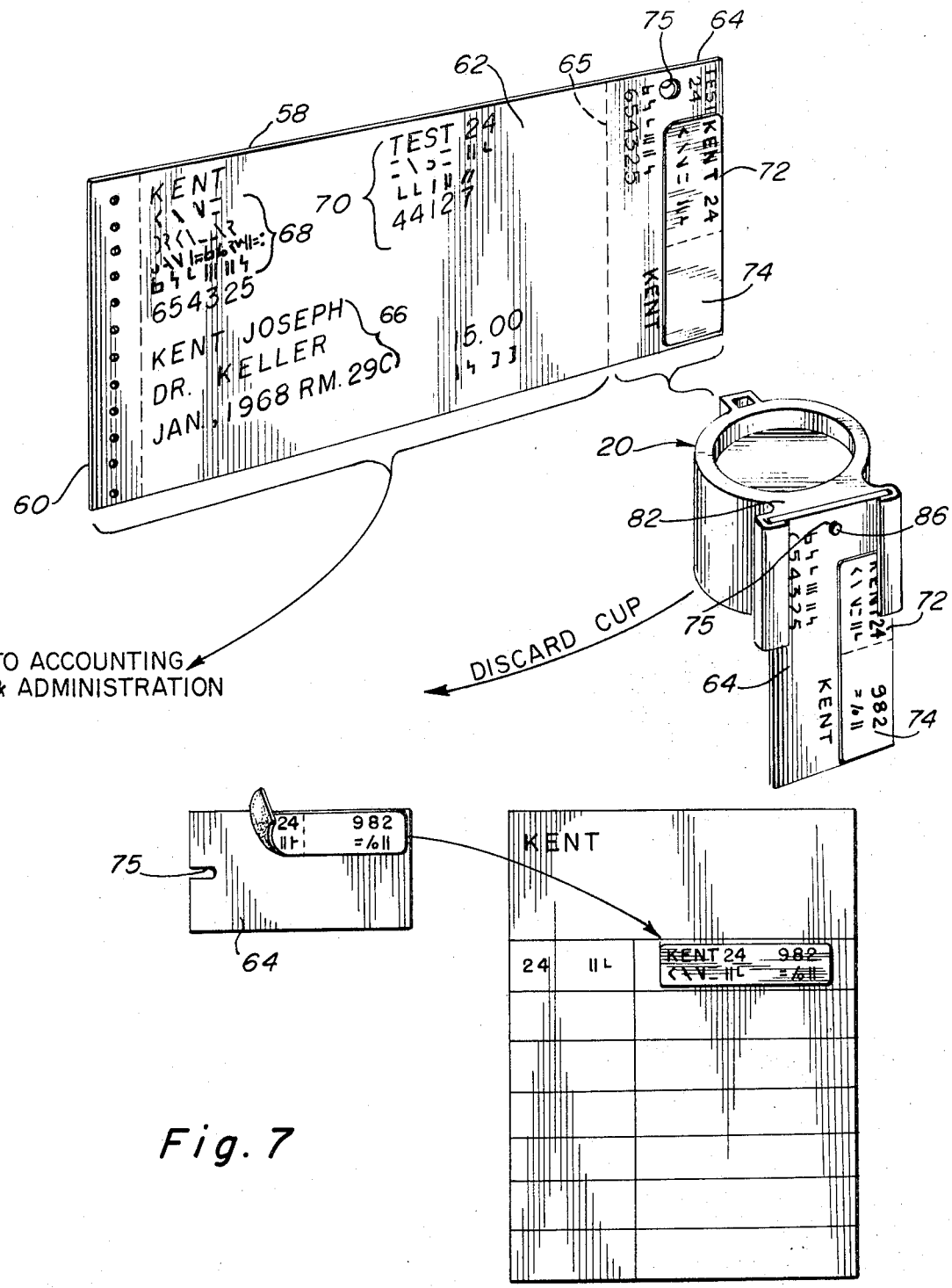
FIG. 7 is a diagrammatic view showing the manner of processing a sample card of the type which includes a peelable label for application to a master source card or chart.

The technician makes as many cards as tests are to be performed, so that as shown in FIG. 4, since six cards were made, it is assumed that six tests are to be performed on test samples. For convenience, these are designated tests A, B, C, D, E and F in FIG. 4, but in actual use the technical description of the test and some code identification will be used. Looking at FIG. 7, a typical test card is illustrated. This card may have carbon duplicates and the like, for administration needs, but will be described here as a single member.

At the left is the perforated mounting slip 60 followed by the large body 62 and at the right hand end there is a stub 64 separated from the body by a row of perforations or cuts 65. The master ID card applies all of the body information including the patient's name, doctor's name, date, room number and so on. This information is on the left at 66 and includes a patient identification number, which is here shown as 654325. This gives a short code designation to the patient and is actually all that would be needed fully to identify him. The data 66 is all human sensible, and in addition, the card may apply machine sensible data as at 68 in the form of bars, punches and the like. These need only represent the identification number 654325. At 70, the technician has entered data representing a description of the test that the card 58 is to represent. As seen, this also includes human sensible and machine sensible indicia. Assume that the test is known as "test 24" in the card of FIG. 7 and that a number representing this specific test is 44217 which is applied in digits and bars and dots.

Down below the entry 70, there is an entry of the cost of the test, this being $15.00 in this case. The technician may have the special series of imprinting plates available to her that carries all of this type of test information and merely inserts the appropriate ones in the printer or embosser for the particular test desired as shown at 53. Obviously, there will be different data at 70 for each card 58, but the data at 66 and 68 will be the same for all cards.

In addition to imprinting or embossing the patient and test information on the body, this same information is applied to the stub 64. As seen, the stub 64 carries the number 24 as a visual identification of the test, the patient number 654325, bars and dots for machine identification of the patient, a human sensible imprinting of the patient's name "Kent," and so on. It will be noted that in this case the stub 64 has a peelable label 72 with a blank area 74 within which the test results are to be recorded, and this form of card 58 will be described in detail in connection with the description of the system. It is intended for manual transfer of the peelable label as explained. In cases of automatic reading of the stubs, no peelable label is needed, but is conveniently included to give the user a choice of manual or automatic summarizing. Each stub 64 is also punched at its upper end, providing an index perforation 75. Reference made to "cards" in the claims and in general explanation of the invention is intended to identify the stubs only since the stubs are the only parts which become associated with the containers. The "body" portion of the cards 58 are used only for accounting and administrative purposes.

In the case of FIG. 4, for brevity, most of the imprinted data has not been illustrated, the patient being designated X, and the test A, B, C, etc.

The technician's tray 56 carries the raw sample tubes 54 and the stubs 64 of the cards 58 to the laboratory. Preferably, when prepared at the nurse's station, the cards are separated on their perforations 65, the stubs 64 retained, and the bodies 62 sent to the accounting and/or administration department of the hospital. The bodies 62 are available for records and billing of the tests being performed. The stubs are retained for connection to the sample cups or containers 20. As an alternative, when the technician prepares the test cards 58, the entire card may be taken to the laboratory and there the bodies separated from the stubs and sent to accounting or returned to the principal nurse at the nurse's station.

As shown by the flow lines of FIG. 4, the raw samples are processed in the laboratory and placed in cups or containers 20. It will be seen that there are six cups or containers 20 illustrated and each will have a test sample therein already processed and ready for testing. Each will be intended for a different test, however, although all will be positively identified with one patient. Furthermore, several tests may be performed in the same machine. Each of the containers 20 has an integral bracket 82 which provides a channel 84 into which the stubs 64 of the respective cards 58 are inserted. A different stub is attached to each bracket and the stubs are indexed properly by having the integral pin 86 in each channel engage within the index perforation 75 of the stub 64 engaged thereon.

At 90 in FIG. 4 it is seen that there are six containers, each having a different stub connected therewith, the stubs all carrying the patient identification and each carrying its own test identification. This is indicated by the letters A through F representing the tests. The patient is called X and this is on every stub as well. The peelable labels 72 also carry all of this information, but this is not illustrated at 90 due to the small scale of the diagram. It is presumed to be present, this being an important requisite of this invention.

Up to this point, the laboratory has a plurality of test containers with depending stubs connected to the respective containers, all containers carrying samples from the same patient X. Other patients have also been visited by the same or other technicians and their raw fluids brought to the laboratory, processed and the resulting test samples deposited in containers 20 having identifying stubs attached thereto. We may assume that in this case every one of three patients X, Y and Z has had six test samples prepared for the six tests A, B, C, D, E and F. From the condition represented at 90, the containers for tests A and E of patient X are brought to a testing apparatus 92-1 for the performance of the A and E tests. In addition, the containers for tests A and E of all other patients are brought to testing apparatus 92 for all of them to have tests A and E performed. Apparatus 92-1 is designated testing machine 1 and may comprise complete testing and printing and control structure illustrated in FIG. 3. The containers from all of the different patients which are to have tests A and E performed are mounted in a rack like 22 and the test apparatus is operated. This is schematically illustrated at the bottom of FIG. 4, where it is seen that in addition to patient X's containers for tests A and B, similar containers are obtained from the sample containers or patients Y and Z. In this step it may be appreciated that the order of placing containers with their connected stubs in the rack 22 is of absolutely no consequence. No information is derived from their order.

Two additional testing machines 92-2 and 92-3 are shown in FIG. 4, these being of any suitable construction. It may be assumed that machine 92-2 is capable of performing tests B, C and D, while the machine 92-3 can only perform test F. It is immaterial how many machines are used and the number of tests each performs. There may be one machine for each test or one machine may be capable of performing a large number of tests. In spectrophotometry, different reagents with identical fluids may produce totally different fluid samples, all emanating from the same source, but giving different absorbance readings when subjected to the same monochromatic light.

The distribution of sample containers for the different tests is shown in FIG. 4. From patient X, the A and E containers are brought to testing machine 92-1 with the similar samples from patients Y and Z; the B, C and D samples of all patients are brought to machine 92-2 since this machine is capable of making tests B, C and D; and all F samples are brought to machine 92-3.

In this view as in other diagrammatic views, the containers 20 are represented by circles with small inverted T-shaped lines connected respectively thereto, at least in diagrammatic plan view.

In FIG. 5 the progress of the containers with attached stubs is shown by another flow chart, but this after the tests have been completed. Three containers are followed, only the container with sample XA being detailed. Following the progress of the sample for test A from the patient X, note the flow line 100 whichl eads to two branches 102 and 104. When the test is completed, the container and stub are taken from the rack and the stub is removed, this being shown by the flow line branch 102 at 64. This stub now carries the test results 106 in the area 74 in addition to test description and patient identification. For brevity, the peelable label 72 is shown to carry the letters X and A, representing patient and test description, respectively, and machine sensible data. The container 20 and its sample are no longer needed and are discarded at 104. Following flow line 107 the label 72 is peeled from the stub 64 which is discarded at 108. The label 72 follows flow line 110 and is manually applied in a suitable blank space on the master card 111 for patient X. Spaces are provided for the application of the peelable labels for all of the tests which are to be performed on the samples prepared from the fluids drawn from patient X. The other samples for the other patients are readily treated in the same manner until all patient cards are filled with the properly applied labels. Two other samples may be followed by the flow lines 112–119. In the second example, test D for patient X has been performed and the information entered on the peelable label of the stub carrying the data D and patient X identification. The cup or container is removed at 112, the cup XD is discarded at 113 after removing the stub; the label is peeled off and the stub XD is discarded at 114; and the label 72 itself is adhered to the master card 111 for patient X as indicated by the line 115. The lines 116–119 identify a similar method of handling container YF from testing machine 92–3 to the patient Y's master test card 20. After all containers and stubs have been processed, all tests for each patient will appear on the respective patient master cards.

As mentioned, the use of a peelable label is not absolutely needed where computer or automatic read-out equipment is available. In FIG. 5 there is illustrated a system which eliminates the need for the peelable labels, master cards, such as 111 and 120, and the need for manual handling of the stubs beyond stacking them in random order. An electronic or mechanical reader 124 reads a stack of stubs shown at 126 by any suitable mechanism, such as drive rolls 128 and sensing means (not shown) which are well known. For example, the stubs 64 are all stacked by using a rod 130 threaded through the indexing perforations 75 of the stubs, then removed. Each stub is read and then discarded at 132 the reader storing the data, transmitting it, etc. This could be a device which transmits the data to a central computer for classification, printing, summary, etc. This technique and the apparatus for carrying the same out are well known. In this way, the test and patient data are automatically entered in the patients' records, without the need for the intervening processes of forming the master cards out of collections of labels.

Although not essential where reading is to be done mechanically or electronically, the peelable label is advantageous. Its use enables cards like 58 to be made which are suitable for manual classification or machine reading. For the latter, one does not remove the labels, but handles the stubs with the labels still in place. Also, where the stub will be discarded, as in the procedure described in connection with FIG. 5, complete information on it is not essential, but it may be used for accounting and administrative information in addition to or in lieu of the body portion 62, previously referred to.

Figure 9:
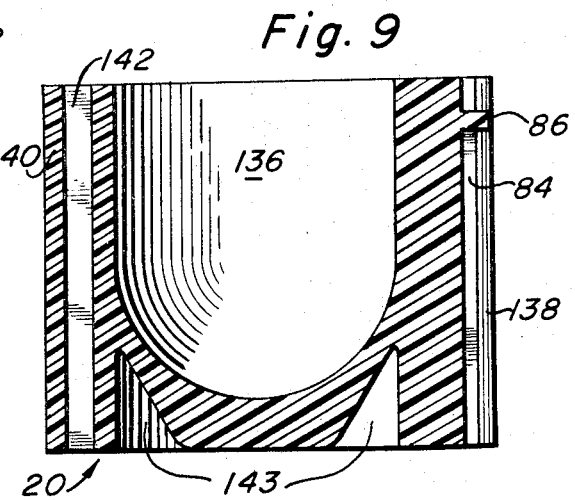
FIG. 9 is a sectional view taken along the vertical median plane indicated by the line 9—9 of FIG. 8 and in the indicated direction.

Considering now the containers 20 in detail, these are preferably molded from economical plastic, such as synthetic resins, and hence may be disposable. The central cavity 136 may be of any shape, considering the manner of processing the raw fluids to obtain the test samples. Mixing and diluting are considerations, but the specific configuration of the cavity is not subject matter of this specification. The bracket 82 has been described above, and the channel 84 with its indexing pin 86 have also been described. The channel 84 is formed by juxtaposed integral inwardly directed flanges 138 whose dimensions are chosen to receive the stubs 64 in firm engagement. The container 20 also carries an enlarged formation 140 which has an axial passageway 142, considering the container body 144 to be generally cylindrical whereby to define the axial direction. This passage 142 is the socket which has been mentioned above, and it cooperates with a post on the rack 22. FIG. 9 shows the container in section to illustrate the details and illustrate hollow formations 143 to economize on materials during molding.

Figure 12:
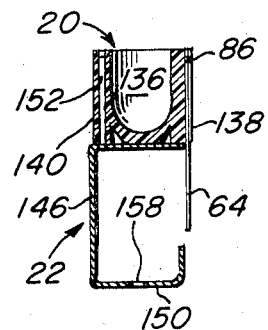
FIG. 12 is a sectional view taken transversely of the rack of FIG. 11, illustrating also a section taken through a container and sample card carried by the rack.
Figure 8:
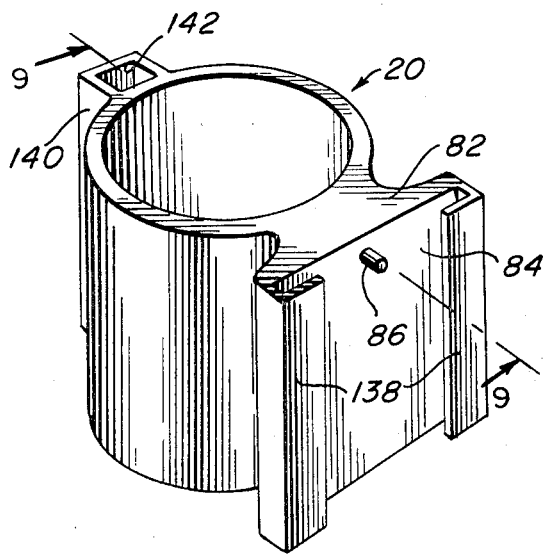
FIG. 8 is a perspective view of a container constructed in accordance with one aspect of the invention.
Figure 10:
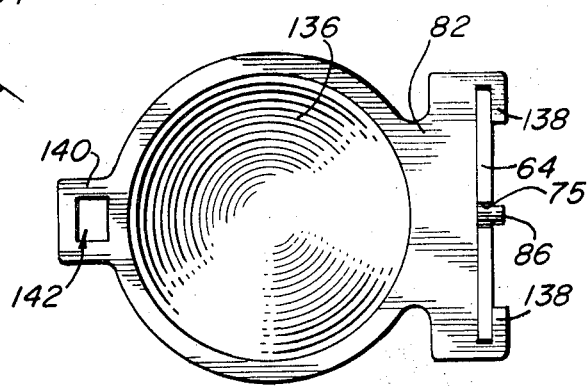
FIG. 10 is a top plan view of the container of FIG. 8.

The carrier or rack 22 has a vertical rear wall 146, a table top 148 and a bottom wall 150. The table top supports the bottoms of the respective containers 20 which are mounted to the rack or carrier 22, each of these containers being secured in proper position on the rack by engaging the sockets 142 on the respective square cross- section posts 152 fixed to the table top 148. In this condition, a stub 64 mounted in the bracket 82 of any container 20 will hang down below the table top 148 as shown in FIG. 12, and in FIGS. 1 and 2. In this manner, a back-up plate 154 carried by the printer 30 will move directly behind the stub 64 when in printing position to support it when the printing wheels 155 engage. Conversely, the depending stub moves into a channel formation provided in the printer. Other structures are feasible, as, for example, having the carrier 22 itself have an integral back-up plate to permit easily printing data on the stub.

The carrier or rack 22 is moved by some driving means 26 linked thereto, as indicated at 32. This could take the form of a sprocket wheel 156 rotated by a controlled motor and sprocket chain (not shown) engaging, for example, sprocket slots 158 formed in the bottom wall 150.

The invention is capable of substantial variation without departing from the spirit thereof. For example, the containers may be provided with magnetic surfaces and all of the data entered thereon by recording heads, and read off by pick-ups. Other modifications and changes will occur to those who understand this art.

What is desired to be secured by Letters Patent of the United States is:

1. A system for processing a plurality of samples being tested in at least one testing machine and maintaining identification of sample and testing results, each sample having a different character by reason of differences in source or type of test to be performed and capable of being described by indicia, comprising:
    (a) a plurality of sample containers, each sample container having an identification card carrying indicia identifying said source and the description of the test to be performed,
    (b) sample testing means for performing the test identified by said indicia on the several cards,
    (c) means for bringing the sample containers to have the tests performed into sample-testing relation with said sample testing means and for holding them in sample-testing relation during the test,
    (d) a data printer disposed in position to print test results data on the identification card of a sample container while said container is in said sample-testing relation, and
    (e) means for operating the sample testing means and data printer in timed relation for each sample container brought into said sample-testing relation whereby the test will be completed and the test results data printed on said identification card substantially simultaneously.

2. The system as claimed in claim 1 in which there is a plurality of sample testing means, each arranged to perform a different type of testing, each sample container identification card carries the description of a test to be performed by one of said testing means, and all of the containers intended to have a common type of test performed on their samples are associated with said means for bringing them into sample-testing relation with the one sample testing means to perform the common type of test, and said operating means tests and records data for each sample seriatim while moving the containers into and out of sample-testing relation seriatim.

3. The system as claimed in claim 2 in which each identification card includes a peelable and readherable label also carrying source and test description indicia, each of said labels including an area in proper position relative to said data printers whereby to receive therein the test results when applied, so that after testing, said labels may be removed from their respective cards and classified in accordance with source and description of tests by adhering same to summary information members.

4. The system as claimed in claim 2 in which said means for bringing said containers into sample-testing relation comprise a plurality of carriers, each carrier holding a plurality of containers intended to have said common type of test performed thereon, each testing means and its associated data printer having a stepping mechanism operating in synchronism therewith for moving a carrier in a repetitive cycle to test all of the samples in the containers carried by said last mentioned carrier seriatim.

5. The system as claimed in claim 1 in which said identification card includes a peelable and readherable label also carrying source and test description indicia, said label including a field which will receive the test results therein from said data printer, so that after testing, the label may be removed and adhered to a summary information member along with other information, all related to the same source.

6. The system as claimed in claim 1 in which said container identification cards are readily separable from their respective containers and means are provided for classifying said cards in accordance with test description and source responsive to reading said indicia.

7. The system as claimed in claim 6 in which said indicia are machine sensible, and said classifying means comprise a machine capable of reading said indicia.

8. The system as claimed in claim 1 in which said means for bringing said containers into sample-testing relation comprise a carrier holding a plurality of containers, a stepping mechanism operating in synchronism with the said testing means and data printer operating means for moving said carrier in a repetitive cycle to test all samples seriatim.

9. The system as claimed in claim 8 in which said containers and carrier have cooperative means for properly indexing each container and its respective identification card relative to the testing means and data printer.

10. The system as claimed in claim 9 in which said cooperative indexing means comprise posts on one of said carrier and containers and sockets fitting said posts on the other of said carrier and containers, the posts and sockets being spaced apart along said carrier and preventing lateral movement of the containers relative to the carrier when connected together.

11. The system as claimed in claim 1 in which each container has means for mounting an identification card thereto and the container and card have cooperative indexing means to dispose the identification card of each container in the same relation to the data printer when the container is in sample-testing relation with the sample testing means.

12. The system as claimed in claim 1 in which said sample container comprises a vessel having a cavity therein for retaining a fluid sample, a base for supporting the vessel, means for carrying an identification member removably on the exterior of the vessel, and means for indexing the identification member to cause its attachment at a predetermined location with predetermined disposition.

13. The system of claim 12 in which said carrying means comprise a channel formation integral with said container adapted to receive said identification member therein in sliding movement.

14. The system of claim 13 in combination with an identification member, said member having its edges engaged within said channel formation.

15. The system of claim 14 in which said identification member is substantially longer than said sample container and extends below said base.

16. The system of claim 15 with a rack for transporting the container with other identical containers, the rack and containers having cooperative means for securing the containers on the rack in spaced apart relation, said cooperative means including indexing means to dispose all containers with their identification members facing in the identical direction.

17. The system of claim 16 in which the rack includes a table and the container bases are engaged to the table with the identification members extending below the table edge in each case.

18. The system of claim 13 in which said indexing means comprise a pin on one of said identification member and container, and a passageway for receiving the pin on the other of said identification member and container.

19. The system of claim 12 in which said container has a vertically arranged socket to enable securement of said container upon a post.

20. The system of claim 19 in combination with a rack for transporting the container, said rack having a plurality of spaced apart vertical posts, and adapted to have said container mounted thereon along with other identical containers, each container being secured to a respective post.

21. Apparatus for testing liquid samples contained in sample containers and maintaining identification of the sample source and test results data, comprising:
(a) a sample container having a removable identification member mounted thereon,
(b) a testing machine having sample withdrawing means, automatic testing means for testing the sample withdrawn from the container, and means for converting the test results into digital information signals,
(c) a printing mechanism associated with the testing machine and responsive to the digital information signals to effect printing of test results data on said identification member,
(d) a printing station arranged relative to the printing mechanism to receive the sample container thereat with the identification member properly positioned for printing thereon,
(e) means for placing the sample container in sample testing relation with said testing machine and for holding said sample container in said sample-testing relation during the test to cooperate with said sample-withdrawing means while at the same time positioning said container at said printing station,
(f) and means for operating the testing machine and printing mechanism in timed relation so that the said test results will be applied to said identification member substantially simultaneously with the completion of the test.

22. The apparatus as claimed in claim 21 in which said placing means comprise a carrier having a plurality of containers affixed thereto in spaced relation and means are provided for moving the carrier in steps and in timed relationship with the operation of said testing machine and printing mechanism, so that the liquid samples in the respective containers are tested one at a time and in each case the test data obtained are applied to the identification member of the container whose liquid was tested.

23. The apparatus as claimed in claim 22 in which said carrier comprises a rack having a plurality of posts thereon, and each container has a socket to be engaged upon a post with the container in a position presenting its identification member to said printing station.

24. The apparatus as claimed in claim 23 in which means are provided to support said identification member while data is being applied thereto at said printing station.

25. The apparatus of claim 21 in which said container and its respective identification member have cooperative indexing means such that when the sample container is in said sample-testing relation, the identification member will be in proper position at the printing station to locate the test results data thereon.

26. The apparatus of claim 21 in which said sample withdrawing means comprise a dip tube connected with said machine and normally disposed in a position with its bottom end spaced above the container, and means for moving the container and bottom end of the dip tube one relative to the other to cause immersion of said dip tube in the liquid sample of the container, but only when said container is in sample-testing relation, said last means being operated in timed synchronism with said placing and operating means.

27. A method of testing a sample in a container which carries a removable identification member identifying the source of the sample and the test, said test adapted to be carried out by means of a testing machine that removes sample from the container and produces an output that is to be entered as indicia on the identification member through the medium of a data printer which comprises: moving the container to a sample-testing position adjacent the testing machine, drawing a sample from the container into the testing machine while said member is so positioned and testing the same, converting the output of the testing machine into digital information and feeding said information to said data printer, printing the data on said identification member while the container is at said sample-testing position, moving the container out of said sample-testing position and separating the identification member from the container.

References Cited

UNITED STATES PATENTS

| | | | |
|---|---|---|---|
| 2,069,957 | 2/1937 | Klein | 40—324 |
| 2,095,817 | 10/1937 | Johnson | 40—324 XR |
| 2,276,490 | 3/1942 | Hoofer | 40—324 |
| 2,767,495 | 10/1956 | Harris | 40—310 XR |
| 2,844,893 | 7/1958 | Keller | 40—310 XR |
| 3,232,441 | 2/1966 | Mitscherling | 211—71 |
| 3,266,298 | 8/1966 | Whitehead et al. | 73—53 |
| 3,288,305 | 11/1966 | Bryant et al. | 211—71 |
| 3,320,618 | 5/1967 | Kuch et al. | 346—44 XR |
| 3,350,946 | 11/1967 | Isreeli | 73—423 |

LOUIS R. PRINCE, Primary Examiner

H. C. POST III, Assistant Examiner

U.S. Cl. X.R.

40—324; 73—423; 116—121; 211—71; 356—39